UNITED STATES PATENT OFFICE.

HORACE FREEMAN, OF VANCOUVER, BRITISH COLUMBIA, CANADA.

PROCESS FOR THE PRODUCTION OF ALKALI-METAL CYANID.

1,143,952.   Specification of Letters Patent.   Patented June 22, 1915.

No Drawing.   Application filed October 13, 1914.   Serial No. 866,508.

*To all whom it may concern:*

Be it known that I, HORACE FREEMAN, a citizen of the Dominion of Canada, residing at Vancouver, in the Province of British Columbia, Canada, have invented certain new and useful Improvements in Processes for the Production of Alkali-Metal Cyanid, of which the following is a specification.

This invention relates to a process for the production of alkali metal cyanid and the object of it is to produce a commercially pure, white cyanid from the impure cyanid, as at present prepared by various methods from the cyanamids of the alkaline earth metals.

Under any commercially practicable process, the cyanids produced from cyanamids are distinctly impure and discolored, and are unfitted for the purposes for which cyanid is usually required.

The process, which is the subject of the present application, will produce in an economical manner a high grade white cyanid from any suitable impure cyanid, such as the crude alkali cyanids, as obtained at present from calcium cyanamid.

The process is fully described in the following specification and its essential novel features are set forth in the appended claims.

In general description, the process comprises, first the conversion of the crude cyanid in solution into alkali ferro-cyanid, (substantially according to the following reaction $6 NaCN + Fe(OH)_2 = Na_4FeC_6N_6 + 2NaOH$), and the crystallization of the ferro-cyanid, whereby the impurities are eliminated without loss of cyanogen: The conversion of the ferro-salt to cyanid by re-substituting the iron with alkali metal (according substantially to the following reaction, to wit: $Na_4FeC_6N_6 + 2Na = 6NaCN + Fe$).

In carrying out this process the crude alkali metal cyanid is dissolved with water, and this solution is heated with a suitable compound of iron, such as freshly precipitated ferrous hydrate.

The solution of alkali ferro-cyanid thus produced is, after filtration, concentrated and the ferro-salt crystallized out. The crystals of the pure ferro-salt are dehydrated and this dehydrated ferro-cyanid is reconverted to cyanid by adding to it an alkali metal corresponding to the cyanid required and by heating to fusion the dehydrated ferro-cyanid and alkali metal together in a suitable vessel containing molten lead against which they are agitated. The alkali metal should be in slight excess of the amount theoretically required to replace the iron, which iron is thrown out in a finely divided state from the ferro-cyanid and is gathered up by the molten lead. After continued agitation to insure separation of all the iron, the mass is allowed to settle and the cyanid is obtained in a fused clear condition ready for molding. The alkali metal cyanid so produced is in a white commercially pure state.

The essential features of the process are the elimination of the impurities of the crude alkali cyanid by converting the cyanid in it to ferro-cyanid in solution, and the crystallization of the ferrocyanid from the solution after filtration and concentration, the fusion of the dehydrated ferro-cyanid with alkali metal and the agitation of the mass in contact with molten lead. This conversion of the cyanid to ferrocyanid and the elimination of the impurities by crystallization are easily accomplished without appreciable loss of cyanogen.

The ferro-salt so obtained is substantially pure and the reconversion of it to cyanid in the manner described, if care is taken that an excess of the alkali metal over the theoretical amount required to replace the iron, produces a pure white cyanid.

I am aware that heretofore alkali metal cyanid has been produced by a process wherein the ferro-cyanid has been fused along with an alloy of sodium and lead wherein the displaced iron was taken up by the lead. This process has many practical defects, chiefly in the difficulties of manipulation on a commercial scale and the slowness of reaction. My invention differs from this old process in that the alkali metal is not alloyed with the lead but being agitated with the ferro-cyanid on a surface of molten lead is free to react directly with the ferro-cyanid and thus insure a more rapid and complete reaction and the displaced iron is at once taken up by the lead. My process is also capable of the exact manipulation necessary to obtain satisfactory results, can be conducted under conditions of practical manufacture and produces a cyanid of unvarying purity and color.

Having now particularly described my invention, I hereby declare that what I claim as new and desire to be protected in by Letters Patent, is:

1. A process for the production of high grade alkali metal cyanid from crude cyanid, said process comprising converting the cyanid of the crude material to alkali metal ferro-cyanid, purifying the ferro-salt and reconverting the purified ferro-salt to alkali metal cyanid.

2. A process for the production of high grade alkali metal cyanid from crude cyanid, said process comprising converting the cyanid of the crude material to alkali metal ferro-cyanid in solution, eliminating the impurities by crystallization of the ferro-salt from the solution, and reconverting the purified ferro-salt to alkali metal cyanid.

3. A process for the production of high grade alakli metal cyanid from crude alkali metal cyanid, said process comprising converting the cyanid of crude material to alkali metal ferro-cyanid, purifying the ferro-cyanid and fusing the dehydrated ferro-salt in association with alkali metal and in contact with molten lead.

4. A process for the production of high grade alkali cyanid from crude cyanid, said process comprising the converting the cyanid of the crude material to alkali ferro-cyanid by heating a solution of the crude alkali cyanid with a ferrous-hydrate, purifying the ferro-cyanid by crystallization of it from the solution and reconverting of the pure ferro-salt to alkali cyanid.

5. A process for producing high grade alkali metal cyanid from crude cyanid, which consists in first converting the crude cyanid to alkali metal ferro-cyanid, then purifying such ferro-cyanid and subsequently reconverting the pure ferro-cyanid to alkali metal cyanid by heating the dehydrated ferro-salt in a suitable vessel in association with alkali metal and on a bath of molten lead.

6. In a process for the production of high grade alkali metal cyanid from crude cyanid, the step which consists in converting alkali metal ferro-cyanid to alkali metal cyanid, the same consisting in fusing the dehydrated ferro-cyanid with alkali metal, the fusion taking place in contact with molten lead.

7. In a process for the production of high grade alkali metal cyanid from crude cyanid, the step which consists in converting alkali metal ferro-cyanid to alkali metal cyanid, said step comprising fusing the dehydrated ferro-cyanid with alkali metal and agitating the mass in contact with molten lead.

8. A process for the production of high grade alkali cyanid from crude cyanid, said process comprising the conversion of the cyanid of the crude material to aklali ferro-cyanid by heating a solution of the crude alkali cyanid with ferrous hydrate, the crystallization of the ferro-cyanid from the solution and the reconversion of the pure ferro-cyanid to an alkali cyanid by the substitution of an alkali metal for the iron.

In testimony whereof I affix my signature in presence of two witnesses.

HORACE FREEMAN.

Witnesses:
ROWLAND BRITTAIN,
MAY WHYTE.